United States Patent
Southern et al.

(10) Patent No.: US 9,553,823 B2
(45) Date of Patent: Jan. 24, 2017

(54) PROCESS MIGRATION METHOD, COMPUTER SYSTEM AND INTERMEDIATE COMPUTING RESOURCES

(71) Applicant: FUJITSU LIMITED, Kawasaki-shi, Kanagawa (JP)

(72) Inventors: James Alastair Southern, Reading (GB); Nicholas Wilson, West Drayton (GB); Serban Georgescu, London (GB); Peter Chow, Gillingham (GB)

(73) Assignee: FUJITSU LIMITED, Kawasaki (JP)

( * ) Notice: Subject to any disclaimer, the term of this patent is extended or adjusted under 35 U.S.C. 154(b) by 277 days.

(21) Appl. No.: 14/266,301

(22) Filed: Apr. 30, 2014

(65) Prior Publication Data
US 2014/0359130 A1    Dec. 4, 2014

(30) Foreign Application Priority Data

Jun. 4, 2013   (EP) .................................... 13170481

(51) Int. Cl.
*H04L 12/911* (2013.01)
*G06F 9/48* (2006.01)
*G06F 9/50* (2006.01)

(52) U.S. Cl.
CPC ............. *H04L 47/70* (2013.01); *G06F 9/4856* (2013.01); *G06F 9/5077* (2013.01)

(58) Field of Classification Search
CPC ....... H04L 47/70; G06F 9/4856; G06F 9/5077
See application file for complete search history.

(56) References Cited

U.S. PATENT DOCUMENTS

| 2003/0187915 A1 | 10/2003 | Sun et al. |
| 2004/0267782 A1 | 12/2004 | Nakano et al. |
| 2008/0256327 A1 | 10/2008 | Jacobs et al. |
| 2009/0089787 A1 | 4/2009 | Giles et al. |
| 2009/0182970 A1* | 7/2009 | Battista ................. G06F 9/5077 711/173 |
| 2012/0011519 A1 | 1/2012 | Ganesh |
| 2012/0084747 A1 | 4/2012 | Chakradhar et al. |
| 2012/0137293 A1 | 5/2012 | Bozek et al. |
| 2012/0265884 A1 | 10/2012 | Zhang et al. |

FOREIGN PATENT DOCUMENTS

| CN | 102170474 | 8/2011 |
| WO | WO 2012/142069 A2 | 10/2012 |

OTHER PUBLICATIONS

Extended European Search Report mailed Nov. 21, 2013 in corresponding European Patent Application No. 13170481.9.

* cited by examiner

*Primary Examiner* — Kim T Nguyen
(74) *Attorney, Agent, or Firm* — Staas & Halsey LLP (57) ABSTRACT

A process migration method comprising
 executing a computer program on current computing resources, in a current partition of computations to parallel processes, each parallel process carrying out at least one computation;
 communicating current partition data to intermediate computing resources;
 using the intermediate computing resources to calculate new partition data including a new allocation of computations to processes for use on changed computing resources; and
 migrating the process execution to the changed computing resources by communicating the new partition data to the changed computing resources.

15 Claims, 9 Drawing Sheets

PROCESS MIGRATION METHOD, COMPUTER SYSTEM AND INTERMEDIATE COMPUTING RESOURCES

CROSS-REFERENCE TO RELATED APPLICATIONS

This application claims the benefit of European Application No. 013170481.9, filed Jun. 4, 2013, the disclosure of which is incorporated herein by reference.

BACKGROUND

1. Field

The present invention relates to migration of computing processes, in particular to when the processes are running in parallel on a distributed computing system with distributed memory. It also relates to the choice of computing resources (memory and processing capability) used during migration and/or after migration.

2. Description of the Related Art

The invention has practical applications in particular in the area of computer programs which use distributed memory and exchange information dynamically. Many of these programs use distributed processing and memory, such as an interconnected group of CPUs, each with their own memory. The group may be divided to correspond to individual elements, for which some form of computation is required.

One example of such a distributed parallel application is a computer program monitoring a sensor network, or a communications network. Each sensor in a sensor network can be viewed as an individual element requiring computation, for instance to process sensed values and/or to determine characteristics such as overall processing load. The computations can be carried out by a computing program which monitors the sensor network, and can also control the sensor network.

In a communications network, each entity (such as a mobile terminal or user equipment (UE), base station or relay station) can also be viewed as an element requiring computation, for example to determine an overall load. The computations can be carried out by a computing program which monitors and/or controls the communications network.

A further example is in monitoring stock trading, for instance to analyse the data for illegal trading practices. Computation may be required to track the transactions of each trader.

A yet further example is simulation. In many simulations, an iterative computation or iterative sets of computations are carried out, each computation corresponding to a single element in the simulation. Simulation elements may be linked in that a computation for one element of the simulation may require values from other elements of the simulation, so that data transfer between processes carrying out the simulation is considerable. Computer programs carrying out such simulations require the workload associated with the computations to be allocated to suitable computing resource, for example within a distributed system.

In these computer programs and other computer programs with linked computations, there may be a requirement to migrate processes (while they are executing). For example, it may be necessary to move the entire execution to a new computer system or new part of the current computer system to allow for changes in resource utilization by the computer program itself or by other computer programs.

As mentioned previously, there are many computer programs with individual elements requiring individual computation, some also having potential effect on other elements of the simulation. Two examples requiring a high level of communication between elements are use of finite element and finite volume methods to simulate material characteristics, including those of both fluids and solids.

Taking computational fluid dynamics (CFD) as an example, this technique uses numerical methods and algorithms to solve and analyze problems that involve fluid flows. There are many approaches to CFD modeling and other three-dimensional algorithmic modeling, but the same basic three-stage procedure is almost always followed.

During pre-processing, the geometry (physical bounds) of the problem is defined; and the volume occupied by the fluid or other material is divided into discrete cells or nodes (the mesh). The mesh may be uniform or non uniform and its division into cells or nodes may be adaptive, to change the mesh size as appropriate during simulation. The physical modeling is defined using appropriate equations and boundary conditions are defined. In CFD this involves specifying the fluid behavior and properties at the boundaries of the problem. For transient problems, the initial conditions are also defined.

In processing the simulation is started and the equations are solved iteratively on a per cell/per node basis, as a steady-state or transient.

Finally a postprocessor is used for the analysis and visualization of the resulting solution.

The data for each mesh node or discrete cell can be viewed as a single element in the simulation.

Another example of a computer simulation is agent modeling (also referred to as agent-based modeling) in which individuals can be viewed as elements of a simulation.

An agent-based model (ABM) (also sometimes related to the term multi-agent system or multi-agent simulation) is a computational model for simulating the actions and interactions of autonomous agents with a view to assessing their effects on the system as a whole. In many models, each agent is an individual (person, animal or other autonomous element). In order to simulate the individual's behavior, the individual is given attributes, such as a moveable position and rule-based reactions to stimuli, including other individuals.

A further example of simulation is particle simulation, which simulates a dynamic system of particles, usually under the influence of physical forces such as gravity. Each particle may be viewed as a single element in such a simulation.

Computationally intense applications like these are often carried out on high performance computer systems and thus an important application for some invention embodiments is job scheduling and management of such systems. These high performance computer (HPC) systems often provide distributed environments in which there is a plurality of processing units or cores on which processing threads of an executable can run autonomously in parallel.

There are countless configurations of hardware now in use for computing resources, with varying processor powers and amounts of memory, as well as different physical arrangements for memory and processor capability and the interconnect between the two. Many of these different hardware configurations and a large number of different programming models are applicable to high performance computing. A popular approach to high-performance computing currently is the cluster system, in which a plurality of nodes each having one or more multicore processors (or "chips") are interconnected by a high-speed network. Each node (or sometimes each core) is assumed to have its own area of memory. The cluster system can be programmed by a human programmer who writes source code, making use of existing code libraries to carry out generic functions. The source code is then compiled to lower-level executable code, for example code at the ISA (Instruction Set Architecture) level capable of being executed by processor types having a specific instruction set, or to assembly language dedicated to a specific processor. There is often a final stage of assembling or (in the case of a virtual machine, interpreting) the assembly code into executable machine code. The executable form of an application (sometimes simply referred to as an "executable") is run under supervision of an operating system (OS).

Applications for computer systems having multiple cores may be written in a conventional computer language (such as C/C++ or Fortran), augmented by libraries for allowing the programmer to take advantage of the parallel processing abilities of the multiple cores. In this regard, it is usual to refer to "processes" being run on the cores.

In cluster systems and in other distributed memory system, migration of an execution can require synchronization of data.

To assist understanding of the invention to be described, some relevant considerations are set out below, using simulation as an example.

A "fixed number of processors" model assumes that the workload to be distributed, the priority of the job (i.e. how urgently the results are required) and the system on which the job is running will remain constant over the duration of the simulation. However, this may not be the case. Some examples of when the number of processes may change are:

A distributed parallel application may be a computer program monitoring a sensor network or a communications network. Each processor may be responsible for processing the data from a certain part of the network—and be required to do this in real-time. If the volume of data increases (e.g. during peak periods for the communications network) then more resources may be necessary in order to ensure that the application can continue to process the data sufficiently quickly (and fewer resources required at off-peak periods).

As an alternative example, in an adaptive finite element simulation the number of mesh nodes may vary by one or more orders of magnitude over the course of the simulation. In this case, the number of nodes allocated to each processor may become very low compared to the number of halo nodes per processor at some stage of the simulation—leading to a very high communication-to-computation ratio. In this case, it may become faster to run the simulation on a smaller number of processors (reducing the communication).

Or, changed priorities may make it desirable to allocate extra resources to a given job on the HPC system or move the job to an entirely new system. For example, a real-time disaster warning system may be running at low priority on a small subset of the available resources when a sudden event—e.g. an earthquake—perturbs the system that it is simulating, requiring rapid simulation of the consequences using as many resources as can be made available. Simultaneously, other jobs must be scaled down to smaller systems in order to make way for the high priority job.

Further, a response to a failure in one of n processors allocated to a job might be to migrate the execution to run on (n−1) processors (rather than terminating the job entirely).

Thus execution of the computer program itself may require a change in resource within the same system or in a new system, for instance due to development of factors within the program or to external considerations.

It is therefore desirable to provide a way of migrating execution of a computer program that can be used flexibly for different circumstances and that takes into account the difficulty of migration, and optionally also synchronization.

SUMMARY

Additional aspects and/or advantages will be set forth in part in the description which follows and, in part, will be apparent from the description, or may be learned by practice of the invention.

According to an embodiment of the first aspect of the present invention there is provided a process migration method comprising executing a computer program on current computing resources, in a current partition of parallel processes to computations, each parallel process carrying out at least one computation;

communicating current partition data to intermediate computing resources;

using the intermediate computing resources to calculate new partition data including a new allocation of computations to processes for use on changed computing resources; and migrating the process execution to the changed computing resources by communicating the new partition data to the changed computing resources.

According to this embodiment, three different set of computing resources are used: current computing resources, intermediate computing resources and changed computing resources. There are several advantages to using different resources which allow a flexible and efficient migration. For example, the resources for re-partitioning can be chosen specifically for the task of re-partitioning. Also, the task of re-partitioning will not take up valuable computing time in the resources which are allocated to carry out the process itself. Finally, migration methodology may be simpler if the partitioning is carried out completely separately from the process for migration.

Some technical issues in moving a distributed parallel application to a different number of processes are: identifying where it is most appropriate to run the application following a change in its behavior, re-partitioning the application data (i.e. determining which data is located on which process), moving data around to reflect the new partition and synchronizing the application following the migration so that the application can continue. Minimizing migration time, to make sure that there is as little interruption as possible to the progress of the application, is highly advantageous. This is particularly important on a distributed memory system (or when the simulation is being moved from one system to another) since the process of re-partitioning the data across the system (and possibly of communicating the data to its new location) can be time consuming.

In some state-of-the-art systems the application has to be stopped and the data from each process consolidated in one location and written to file (checkpointing). A new application is then started from the checkpointed data, resulting in a delay while the data is consolidated, the output files written, the application resubmitted via the queuing system, the new resources initialized (primarily computing how to distribute the problem over the available resources) and the output files read back in to initiate the application.

In unpublished related art developed by the inventors, this dead time is reduced by allowing the application to continue running on the system from which it is to be moved until the system to which it will be moved is available and while that system carries out the start-up phase. Thus continued computation overlaps with communication of information to allow the execution to continue on the new system (or other changed computing resources). Hence the time interval between computation stopping on the old system and re-starting on the new is minimized. Also, rather than check-pointing, the state data is then communicated directly to the new system, removing the need to read and write files.

The inventors have realized that the problem remaining is how (and where) best to partition the data. The related art suggests that if new resources are to be allocated then these carry out the partitioning before execution is switched from the old resources. This has a major drawback in that this system cannot immediately begin running the simulation when it becomes available. This problem is exacerbated since a massively parallel system may not be able to be used efficiently to partition an application's data: a single large-memory SMP (symmetric multiprocessor) node is likely to be more suitable for such a problem than many thin nodes. Alternatively, if execution of the application is to continue on a subset of the existing resources then that execution is paused while the partitioning is carried out. While the delay caused by such a pause is certain to be less than that caused by checkpointing, it may still be significant.

Invention embodiments allow increased computing resources to be brought on stream or removed from use more quickly than is currently possible. Thus for example any application for which a surge in information requires immediate processing that cannot be handled by current resources may benefit from the invention. Equally, efficient use of computing resources can be furthered by the invention, because when there is a drop in processing requirement of one program, computing resources can be efficiently freed for use by other programs.

After the communication phase, the execution can resume on the changed resources, so that the execution switches from the current resources to the changed resources.

Use of the intermediate computing resources can allow time overlap between processes which were previously carried out sequentially. In one embodiment, the calculation of new partition data overlaps in time with continued execution using the current computing resources. Additionally or alternatively, the calculation of new partition data can overlap in time with allocation of new resources within the changed computing resources.

The changed resources may be running other jobs and, hence, not be available immediately (even if these other jobs are to be stopped or moved the process of doing this may not be instantaneous). This is also the case for the intermediate resources. However, as it is anticipated that the intermediate resources are smaller (and there may be more potential locations for them) it is likely that they can be freed sooner and can begin to prepare for when the changed resources become available.

Although the method of invention embodiments is suitable for use with many different configurations of computing resource, some configurations are particularly suitable for executing the process and others (with a different configuration) may be more suitable for re-partitioning. In one embodiment, the current and changed computing resources comprise distributed memory computing resources and the intermediate computing resources comprise a shared memory computing resource. For example, the intermediate resources may comprise a SMP node.

The SMP node may be a "fat" or large node which will have a large memory size and probably also contain many more cores than a standard "thin" node (it may, for example, be a GPGPU (General-Purpose Graphics Processing Unit) or more likely a CPU augmented with a GPGPU accelerator. Thus, the "fat" node may be a CPU with lots of memory, and a large number of processing cores and it may possibly be accelerated via a co-processor (e.g. a GPGPU or Intel Xeon Phi).

In this case "large" is in comparison to the amount of memory on the "thin" nodes. The SMP node may have ten times, fifty times or even one hundred times the memory available in a node of the current and/or changed computing resources. In one example, how much more memory per node available in such a node may depend on the relative size of the intermediate and current resources. For example, if the partition data is 100 GB in size and there are 100 nodes in the current resources then each of these requires 1 GB of memory to handle the partition data. If, however, only 10 nodes are to be used to re-partition then it will be necessary for each of these to have at least 10 GB of memory available. (If only one node was to be used then that would need 100 GB of memory).

Some embodiments of the present invention also provide a way of selecting the intermediate resources. The intermediate computing resources may be selected by collecting available resource information detailing a plurality of configurations of computing resources available to execute the re-partitioning, and selecting a configuration from among the plurality of configurations detailed in the available resource information which, based on execution information, will be suitable for re-partitioning. The execution information may include information about computing resources available and their effect on execution rate of the partitioning.

Some embodiments of the present invention additionally or alternatively provide an analogous way of selecting the changed resources, in which the changed computing resources are selected by collecting available resource information detailing a plurality of configurations of computing resources available to execute the process, and selecting a configuration from among the plurality of configurations detailed in the available resource information which, based on execution information, will be suitable for execution. Again, the execution information may include information about computing resources available and their effect on execution rate.

In either or both cases, the configurations may each include an indication of an amount and/or type of computing resource available in each of a plurality of categories of computing resource; and the execution information may be in the form of application execution scalability information including a scalability matrix encoding, for computing resources in at least one of the plurality of categories, an indication of how different amounts and/or types of computing resource in that category correlate with execution rate. Effectively, the execution information in the matrix (and other representations) can be used to demonstrate the timing implications of using different configurations.

The scalability matrix may include an entry for each pair of factors from among a plurality of factors comprising each of the plurality of categories of computing resource and execution rate, the entry representing the effect of a proportional change along a linear scale representing usage of different amounts/types of a first factor from the pair of factors on the amount/type required of a second factor from the pair of factors, in terms of a proportional change along a linear scale representing different amounts/types of the second factor.

Invention embodiments are effective in shared memory and distributed memory configurations, but are particularly well suited to distributed memory environments (of which the intermediate resources may be a part using shared memory, or may also use distributed memory). In a process migration method as described previously, each process may use individual current and changed resources including a single processing unit executing the computation and a single region of memory to store process data for the computation. The memory region may be different to each processing unit. The processing unit may be a node or a processor or a core of a multi-core processor in a distributed memory computing system.

Each process may include one iterative computation (for example corresponding to one mesh node of a simulation) or it may include more than one computation (for example so that each process carries out linked computations for more than one mesh node of a simulation).

In any case, in the distributed memory system it can be important to avoid spreading linked computations over more than one processing unit (for instance over more than one node in a distributed system) because the amount of communication required between a set of linked communications is high.

Migration includes communication of partition data that indicates the allocation of computations to processes. The partition data is sent from the current resources to the intermediate resources. Once the current partition data has been received, the processes may be divided among the changed resources. There may be a re-division of computations between processes (re-partitioning) before or after receipt of the partition data (although the re-partitioning has no effect if there is migration to a new system, but no change in the amount of resource available). Both these steps can overlap with computation in the current resources.

In some embodiments the intermediate computing resources are also used to provide a mapping of processes to individual changed resources before migration of the new partition data. Preferably the mapping is transferred to the changed resources at the same time as the new partition data.

Preferably, synchronization follows migration/re-partitioning. Synchronization can include any communication that provides synchronization between processes. It could be communication of time-dependent process data, for example relating to the migrated computations, the communication taking place between the current resources and the changed resources.

Initialization can comprise setting up the new resources after migration and synchronization, so that the processes can continue on the changed resources. Initialization/set-up may include, for example, setting up required data structures in memory, and calculating the values of any dependent variables that are not directly communicated.

According to invention embodiments, synchronization may be required between new group data and current group data (group data is effectively data in memory belonging to all the processes in the group of parallel processes). The synchronization may not be of all the new (migrated) and current data. For example if only a small percentage of processes is divided to give more detail in one area of a simulation, synchronization may take into account only the area which is being modeled in more detail and potentially a limited area around the area. Synchronization is carried out as required.

Preferably synchronization includes communication of state data, which may take any form required by the computer program or application. The term "state data" refers to the time variable data held by the application in memory for each process. Thus the cumulative state data for all the processes makes up the group data. For a mesh-based simulation it could be the values of each variable at each mesh point "owned" by a particular process (responsible for a particular process). For a particle-based simulation it could be the current locations and velocities of each owned particle.

The synchronization can be carried out as part of the computer program or as an external process. If the computer program includes synchronization functionality, this functionality may be associated with the computations so that synchronization is carried out at the end of one instance of all the computations.

Some invention embodiments include synchronization of the migrated execution using communication of state data relating to the migrated computations, the communication taking place between the current resources and the changed resources. State data transfer can take place after re-partitioning: state data is likely to change during continued computations and so its transfer advantageously takes place after re-partitioning and just before the start of execution on the changed computing resources.

In some specific cases, the synchronization is associated with a software implemented equation solver running the computations, preferably either embedded within it or in the form of a wrapper.

If the computations are iterations of an equation solver running in a loop, synchronization may be carried out at the end of one loop, and preferably include running computations for the next loop in both the current computing resources and the changed computing resources, with comparison of the results (as an integrity check). Alternatively, if current resources are no longer to be used, it may be sufficient to re-start the execution in the changed resources with received state data corresponding to a synchronized position in the iterative computation/simulation loops.

The computations may each correspond to a single element or a group of elements in the computer program, such as sensors or nodes in a sensor network, or entities in a communications network. As mentioned previously, one of the preferred computer program types used in progress migration methods of invention embodiments is a simulation program. Thus each element may correspond to a collection of mesh node of a mesh simulation, one or more agents of an agent simulation or one or more particles of a particle simulation.

Moving the execution may simply move the processes to new resources without change to the allocation of computations to processes. However, in other embodiments, the allocation of computations between processes may be changed. Thus if a process previously included two linked, iterative computations, one of these may be moved to a different process during migration. Conversely, a process which previously contained a single computation only might be amalgamated with another process during migration to form a single process with two or more linked computations.

Alternatively or additionally, migration may take place at a time when the overall number of computations in the executable is changed (for example to add or remove elements), thus changing the number of processes. For example, in simulation, more detail may be required for a part of a simulation, involving production of a finer mesh at that position.

Thus, migration may allow an increase or decrease in the number of processes when the number of computations is altered and/or by a changed division of computations into processes.

Selection between increasing and decreasing the number of processes can be made according to whether computing resource requirements of the computer program have increased or decreased. Alternatively the user may specify the number of processes on which the computer program runs, both at the start of the execution and/or for the migration.

The method of invention embodiments is not limited to increasing/decreasing or maintaining the resources and can be used to move to a completely new system. The relationship between the current computing resources and the changed computing resources in the invention embodiments may be any suitable relationship. For example the changed resources may be a sub-set or a super-set of the current resources, or the changed resources may be completely new resources (for example of a different computer system) with a capacity the same as, more or less than the current computing resources.

There are three particular cases of interest in which the method is applied: increasing the available number of processes (for example on the same system), decreasing the available number of processes (for example on the same system) and migrating to a different system (possibly with an increase or decrease in the resources used, for example a migration to a system of a different size). All of these migrations can be automatic, (in which case it is assumed that there is no need for user intervention—for instance by logging on to the new system) even if migration is to a different system.

The method of invention embodiments caters for all of these different migration scenarios. It may include a choice between the scenarios (which may be part of the decision to change the resources used). The decision and choice may be made automatically, for example, according to changing resource requirements of the computer program or of other computer programs. Thus a job scheduler could make the decision and/or choice according to pre-defined rules. Alternatively user input may be provided to influence or determine the choice, for instance by prioritizing one job in a system over others. Optionally the choice is made according to the resource requirements of the computer program.

Thus the method may include initially deciding to change the resources used, and making a choice between increasing the resources used; decreasing the resources used; and moving to different resources, wherein moving to different resources can include increase, decrease or maintenance of the resources used. Also the intermediate resources may be part of the same or a different system from the current resources and/or changed resources. Hence invention embodiments can provide full flexibility in all resource change scenarios.

Invention embodiments may also allow user input if desired. For example, a user may specify one or more of: the migration itself; the choice of the new and/or intermediate computing resources; a job priority or other input which triggers the decision to migrate; the number of processes on which the computer program runs and/or a performance target (such as an execution-related performance target) for the intermediate computing resources and/or changed computing resources, the performance target being used in selection of computing resources.

According to an embodiment of a further aspect of the invention there is provided a computer system operable to carry out process migration comprising:

current computing resources, intermediate computing resources and changed computing resources, all connected via an interconnect;

the current computing resources being configured to execute a computer program, in a current partition of parallel processes to computations, each parallel process carrying out at least one computation;

the interconnect being configured to communicate current partition data to intermediate computing resources;

the intermediate computing resources being configured to calculate new partition data including a new allocation of computations to processes for use on changed computing resources; and the interconnect being further configured to communicate the new partition to the changed computing resources so that the changed computing resources can take over the execution.

According to an embodiment of a further aspect of the invention there are provided intermediate computing resources within a system comprising the intermediate computing resources, current computing resources executing a computer program, in a current partition of parallel processes to computations, each parallel process carrying out at least one computation, and changed computing resources, all connected via an interconnect, the system being operable to carry out process migration;

the intermediate computing resources being configured to receive current partition data from the interconnect, to calculate new partition data including a new allocation of computations to processes for use on changed computing resources; and to communicate the new partition to the changed computing resources so that the changed computing resources can take over the execution.

According to an embodiment of a still further aspect of the present invention there is provided a method of selecting re-partitioning computing resources for a process migration method comprising executing a computer program on current computing resources, in a current partition of parallel processes to computations, each parallel process carrying out at least one computation;

selecting re-partitioning computing resources by collecting available resource information detailing a plurality of configurations of computing resources available to execute the process, and selecting a configuration from among the plurality of configurations detailed in the available resource information which, based on execution information, will be suitable for re-partitioning;

communicating current partition data to the re-partitioning computing resources;

using the re-partitioning computing resources to calculate new partition data including a new allocation of computations to processes for use on changed computing resources; and migrating the process execution to the changed computing resources by communicating the new partition data to the changed computing resources.

In this aspect, the re-partitioning computing resources are not necessarily limited to being different from the current and changed computing resources. For example, if no "fat" SMP node is available, it may be appropriate to use the changed computing resources for partitioning. In this case, communication of partition data may be within the same system.

The computer system may further include other components such as a graphical user interface GUI for the user to input data such as the number of processes required (or data from which the number of processes may be calculated) and output means, for example in the form of a screen for visualization of the results and/or a printer to provide printed results.

According to a further aspect there is provided a program which when loaded onto a computing apparatus such as a distributed memory computer system configures the computing apparatus to carry out the method steps according to any of the preceding method definitions or any combination thereof.

Features and sub-features of any of the different aspects of the invention may be freely combined. For example, preferred embodiments of the computer system may be configured to incorporate functionality corresponding to one or more preferred features of one or more of the methods. Features of the selection method may be combined with features and sub-features of the migration method.

The invention can be implemented in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Each processor may have one or more cores.

Processors suitable for the execution of a computer program include, by way of example, both general and special purpose microprocessors, and any one or more processors of any kind of digital or biological computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Preferred embodiments of the invention manage the migration of data during the process of moving a running simulation between two different systems or between a different number of processors on the same system. Thus the application finds many applications in the field of high-performance computing, in particular in job scheduling and management.

Figure 1:
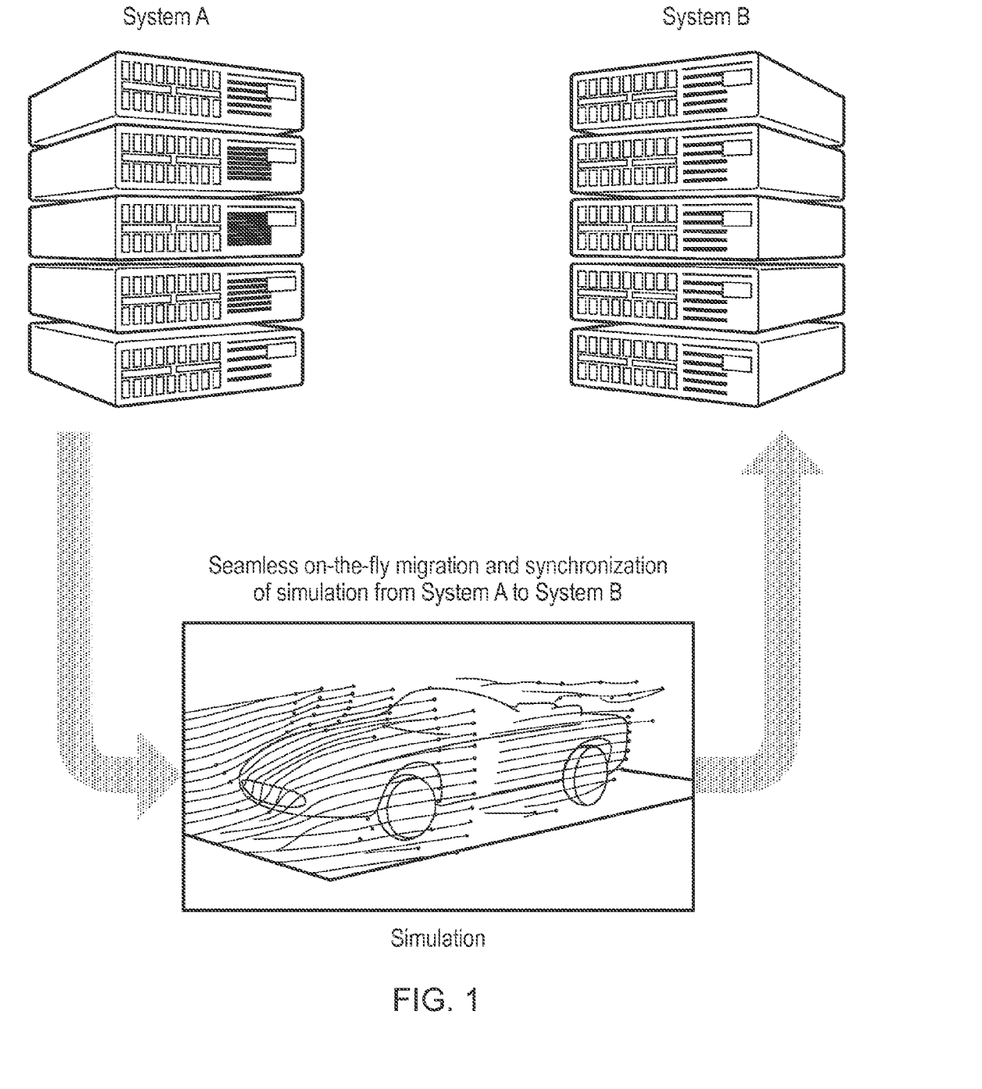
FIG. 1 is an overview diagram of on-the-fly migration.

FIG. 1 is an overview diagram showing how embodiments of the invention can move a simulation of airflow over a vehicle from execution on system A to execution on system B. The movement is referred to as seamless on-the-fly migration and synchronization. Due to use of the intermediate computing resources, it is not necessary to completely stop the simulation process in order to migrate it from system A to system B.

Figure 2:
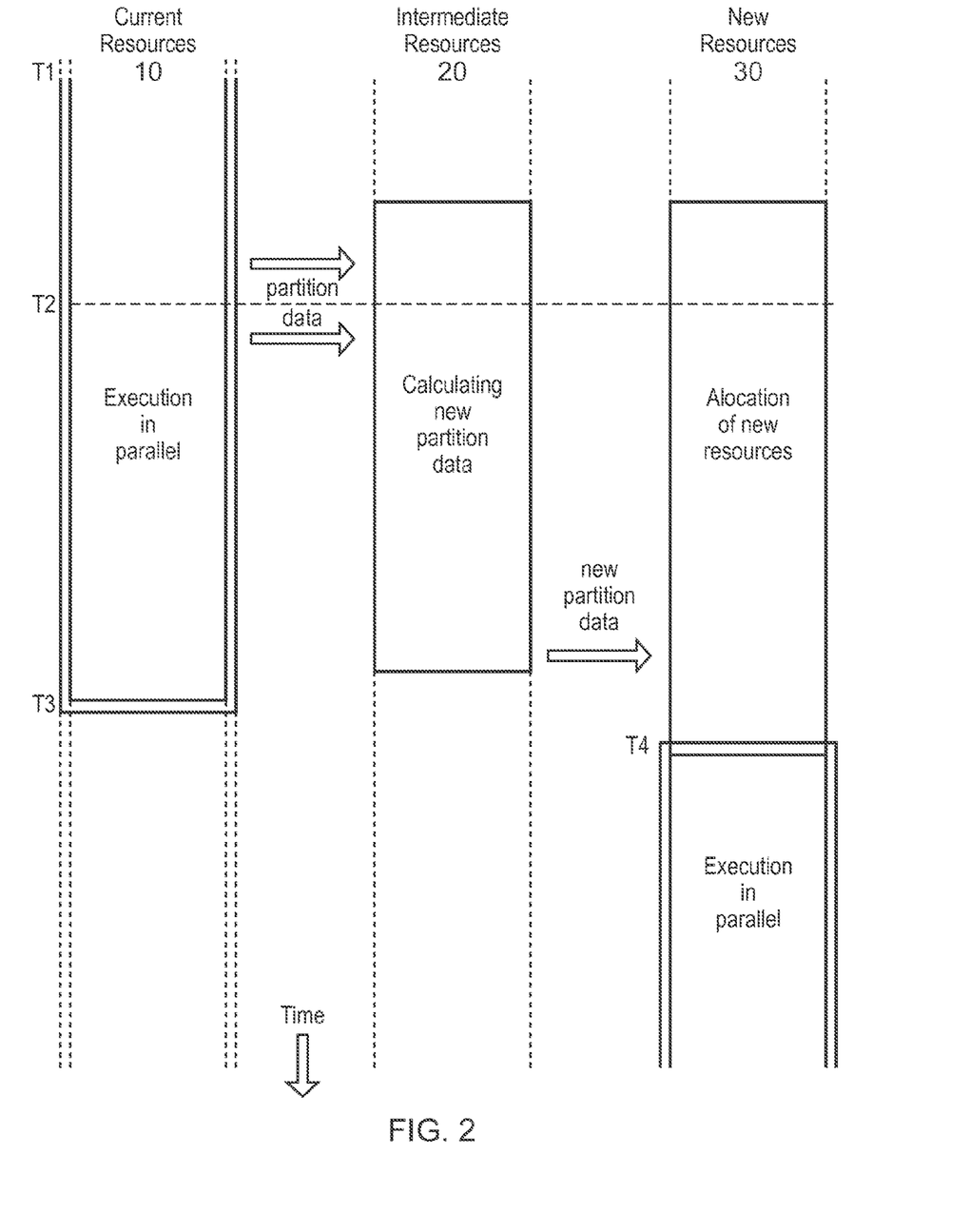
FIG. 2 is a schematic diagram of current resources, intermediate resources and new resources.

FIG. 2 is a time-based schematic diagram showing the movement of execution of an application from current resources 10 to changed resources 30, using intermediate resources 20. The three resources are depicted separately but may be part of the same system. At time T1 execution is in the current resources. The migration is then triggered. Some possible triggers are:

The running application realizes that it needs more (or less or different) resources and sends a request to the system.

The system monitors the application itself and identifies that it could run more effectively elsewhere.

User intervention (e.g. changed priorities require movement of the application from one set of resources to another, possibly following an unexpected event).

In response to the trigger, requests are generated for re-partitioning and for allocation of new resources. The requests may be made at substantially the same time. For example, at time T2 partition data is send to the intermediate resources and new resources are allocated. At time T3 execution in the current resources stops. At time T4 execution in the changed resources resumes.

Synchronization (including transfer of state data from the current resources to the new resources) is not shown but can take place so that state data from the current resources is available after partitioning of the new resources and execution can begin.

It is envisaged that for most of its duration the execution is behaving in a loop fashion, with a similar workflow in each pass through the loop (e.g. time-stepping or iterations in a (non-) linear solver). Migration and synchronization take place at the end of a loop. The synchronization process can be automated. The automation could either be embedded within the equation solver or take the form of a wrapper that is able to control the behavior of the solver, but is not necessary a part of it.

Figure 3:
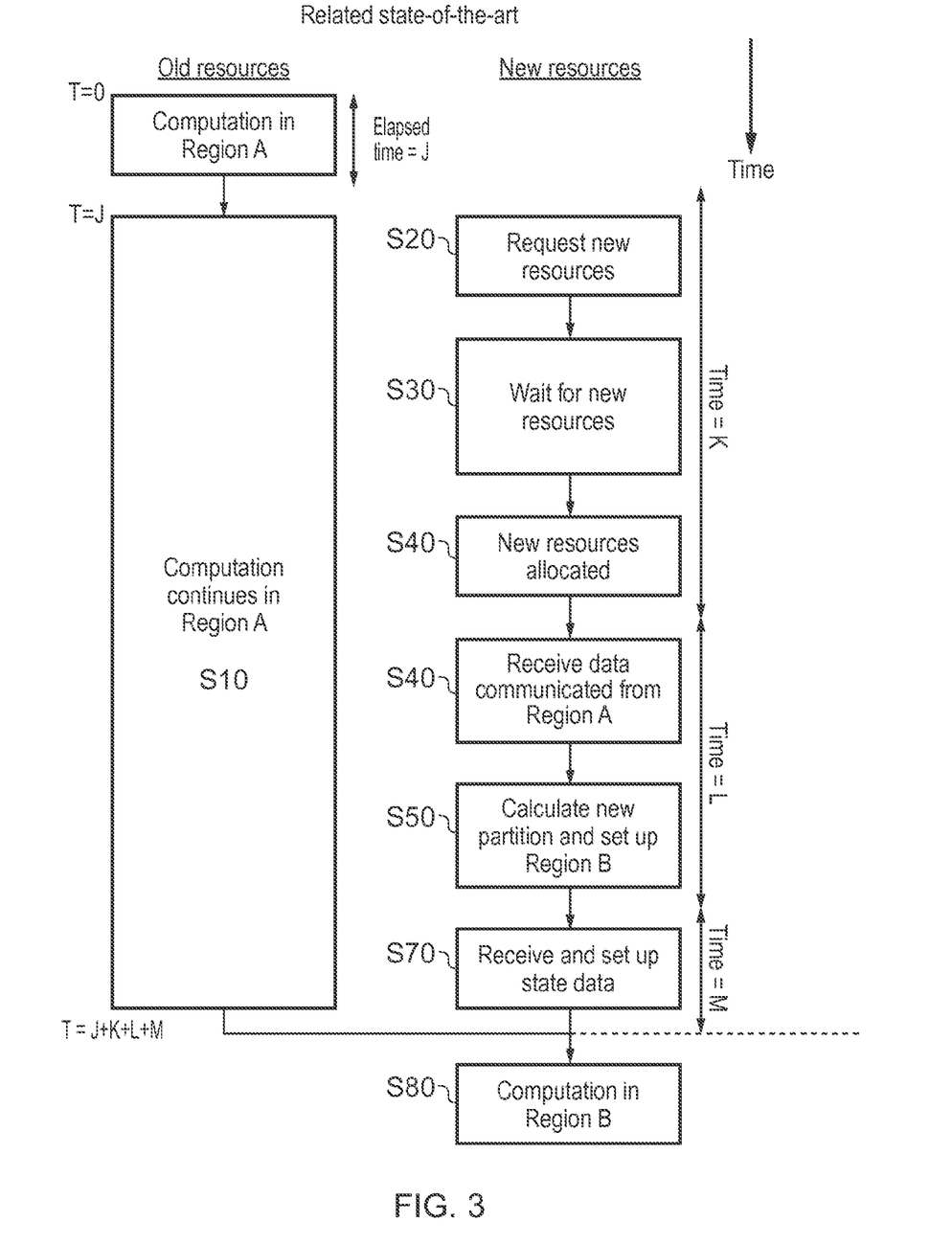
FIG. 3 is a time comparison of an invention embodiment with the related art.

A general overview of the algorithm of invention embodiments is shown in FIG. 3 (with timings approximately to scale). FIG. 3 compares the related art process with an invention embodiment. The novel steps compared to the related art process are in the shaded box.

In both cases calculation is transferred between old resources and new resources. Computation starts in region A at time T=0 in step S10. After a lapsed time J at T=J the migration starts.

Considering the related art procedure first, calculation continues in region A in step S10. New resources are requested in step S20 and there is a delay in step S30 before new resources are allocated in step S40. Thus new resource allocation takes time K. In step S50 the new resources receive data from region A, in the form of a partition, and in step S60 the new resources compute a new partition. Thus re-partitioning takes time L. Finally, in step S70 the new resources receive and set up state date and this synchronization takes time M. Thus time T=K+L+M elapses after the request for new resources and before computation starts in region B in step S80.

The related art process provides an overlap between continued execution and migration and/or synchronization.

In contrast, according to the invention embodiment, overlap in time of allocation of new resources with migration and with continued execution becomes possible. Execution starts at time T=0 for a lapsed time J and there is a request for new resources in step S100. In this embodiment continued execution in region A (step S90) overlaps with partitioning in the intermediate system, in which intermediate resources are allocated (step S110), partition data is received from region A (step S120) and a new partition is calculated and region B set up (step S130). There is also overlap with processing in the new resources, including the delay in step S140 and the allocation of new resources in step S150. In step S160 the new state data is received and set up and in step S170 computation resumes in Region B.

In addition to communication of partition data and communication of the state data a map to determine where data is sent may be calculated.

The idea of the synchronization step is to ensure that the contents of memory on the old and new systems are consistent. Since computation continues on the old system while initializing the new one, it is necessary to synchronies at the appropriate time (not just send state data at the same time as partition data). Equally, execution does not begin on the new system while still running on the old (unless for synchronization purposes as explained later). This would duplicate computation work.

It can be seen from FIG. 3 that the new method cannot be slower than the related art (since if an intermediate system did not become available at least as soon as the new system then the new system could partition as in the related art). In many cases, since the intermediate system would be much smaller than either the new or old (current) systems, suitable intermediate resources should be immediately available, which will result in a time saving compared to the related art (from the overlapped data partitioning and/or faster partitioning on the more suitable resource).

Figure 4:
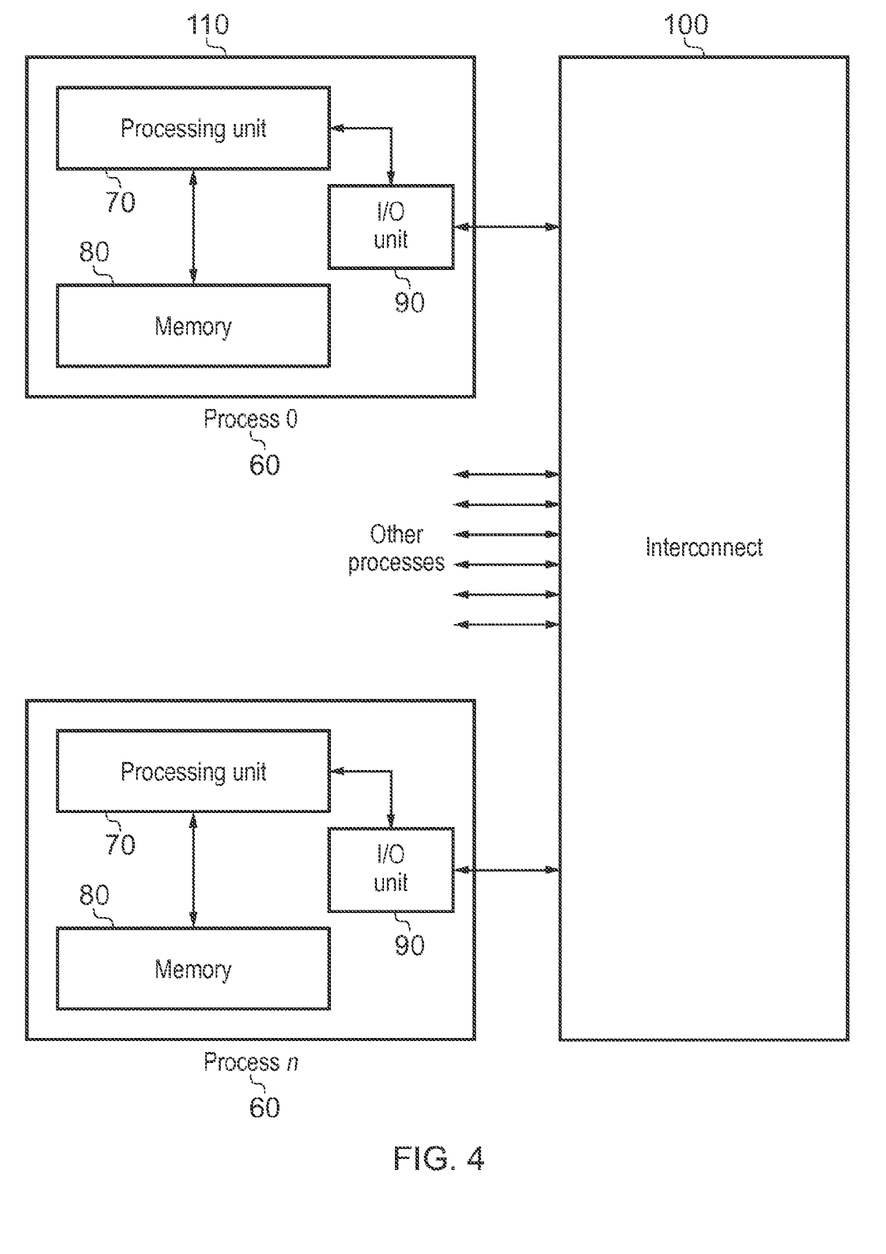
FIG. 4 is a schematic hardware diagram of distributed execution of a computer program.

FIG. 4 shows a schematic diagram illustrating n+1 processes, of which two processes (60), referred to specifically as Process 0 and Process n are shown. Each process uses individual resources including a single processing unit or element (70) and memory (80). The processing unit (70) is connected to an input/output unit (90) and all the processes are interconnected using interconnect (100).

In one specific embodiment, each process is a thread of work that takes place in a single resource block as shown. Each process "owns" at least one computation and may own several linked computations. For example in the case of a simulation, the process can include computation for several adjacent mesh nodes. It can be advantageous to group computations for adjacent mesh nodes in this way because data from adjacent nodes is usually required for the computation for a node in question.

Nodes are re-allocated between processes in re-partitioning. A simple example of re-partitioning is explained below.

Assume a one dimensional problem with a mesh containing 101 nodes uniformly spaced on the interval $0 \le x \le 1$ (i.e. each node is 0.01 from its nearest neighbours). The nodes are numbered sequentially from node 0 at x=0 to node 101 at x=1. The problem is initially run on two processing units. The mesh is initially split so that process 0 is responsible for ("owns") all nodes in the region $0 \le x \le 0.5$ and process 1 owns all nodes in the region $0.5 < x \le 1$. So, process 0 keeps in memory information about the values of variables at nodes 0 to 50 and process 1 keeps in memory information about the values of variables at nodes 51 to 101. For convenience, process 0 also keeps in memory a copy of the information about the values of variables at ("halo owns") node 51 and process 1 halo owns node 50. This is because these nodes are nearest neighbours to a node that is owned by the process and the data is likely to be required to update the data at these owned nodes.

Now suppose that the simulation is to be migrated to run on three processes. The re-partitioning step determines which parts of the mesh will be owned by each of the new processes. So, the new process 0 (which may or may not be on the same processor as the old process 0) may be responsible for the region $0 \le x \le 0.33$ (i.e. nodes 0-33) and halo own node 34; the new process 1 may be responsible for node 34; the new process 1 may be responsible for $0.33 < x \le 0.67$ (i.e. nodes 34-67) and halo own nodes 33 and 68; and the new process 2 may be responsible for $0.67 < x \le 1$ (i.e. nodes 68-101) and halo own node 67.

The new partition creates more halo owned nodes as it spreads out computation across more processes. However spreading out the processes allows use of larger resources for the same computations. Before re-partitioning, the maximum number of processing units was two, which becomes three due to the re-partitioning.

As a result of this re-partitioning, the old process 0 must send the state data for nodes 0-34 to the new process 0 and the state data for nodes 33-50 to the new process 1; and the old process 1 must send the state data for nodes 51-68 to the new process 1 and the state data for nodes 67-101 to the new process 2.

Figure 5:
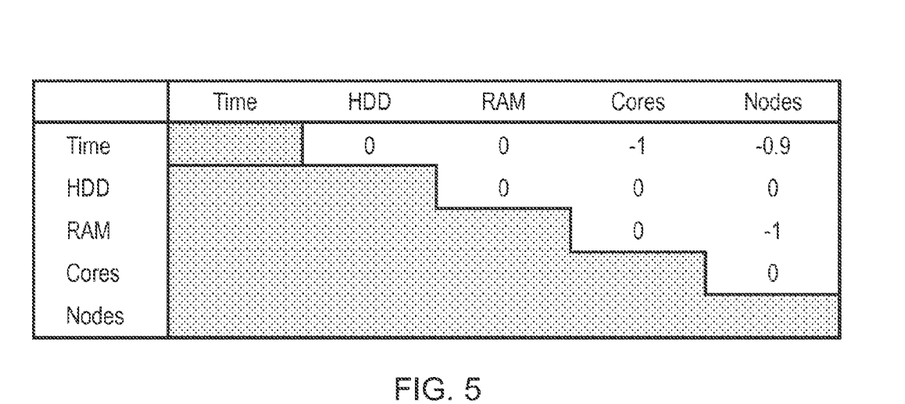
FIG. 5 is a scalability matrix.

FIG. 5 shows a scalability matrix which may be used to select intermediate and/or changed computing resources. The scalability matrix is a simple, compact and efficient format for expressing application execution scalability information. The scalability matrix includes an entry for each pairing of execution variables including time (or execution rate) and at least one category of computing resource. The entry represents the impact of changing the amount or type of one of the pair on the amount or type of the other required to execute the application. Hence, a non-zero entry represents some correlation, or a coupling, between one execution variable and another. At the start of an execution, the scalability matrix may be obtained by the application. Alternatively, the scalability matrix can be read from a third party module, such as a database.

The scalability matrix may represent first order (i.e. linear) relationships between execution variables, or may be configured to contain more than one entry per execution variable pairing in order to represent more complex relationships. In this example, a first order scalability matrix is considered. The exemplary first order scalability matrix has the following properties:

it is square and symmetric;
one entry is always execution time (or execution rate);
all other entries are categories of computing resource (e.g. RAM, CPU cores, Nodes, etc)
entry (I,J) contains the dependence of execution time or state variable I of state variable J in the form of a scaling coefficient.

The FIG. 5 matrix is an exemplary first order scalability matrix. The matrix contains the execution time (Time) plus four state variables: (hard disk drive) HDD performance Memory size (RAM), the number of cores per CPU socket (Cores) and the number of nodes (Nodes). HDD, RAM, Cores, and Nodes are examples of categories of computing resource. Specifically, they are categories of computing resource in which a type or amount of that category of resource can be selected for use in executing the application.

The first row shows how the execution time depends on the state variables. In the example of FIG. 5, the fact that a change in HDD performance or available RAM does not impact on the execution time is represented by a "0" entry. On the other hand, the execution time is strongly influenced by the number of cores and number of nodes. A value of "1" or "−1" represents perfect scalability, wherein the negative sign indicates decrease. For example, the "−1" value for Cores shows the fact that a doubling in the number of cores will halve the execution time.

The second row shows that there is no coupling between the HDD performance and the rest of the execution variables while the third row indicates that the amount of available RAM scales perfectly with the number of nodes, e.g. a doubling of the number of nodes results in half the needed RAM.

The entries of the 1st order scalability matrix are a numerical indication of the linear part of the scalability curves of the scaling relationship between two execution variables. For a more accurate representation of the scaling relationship (dependence), higher order terms can be added to the 1st order terms resulting in higher order scalability matrices.

An additional state variable which may also be, but is not necessarily included in the scalability matrix, is the Cost (which may be a financial cost of the service or any other cost, e.g. power, CO2). Depending on the cost policy of the execution environment 120, some of the execution variables may be related to Cost, where the values are received with the available resource information, e.g. the resource table, from the execution environment 120. For example, the number of cores, the number of nodes and the size of the data stored on the HDD may incur a cost.

The scalability matrix serves two main purposes:
provides a list of categories of computing resource for which the selection of an amount or type of resource within that category affects the execution of the application. These are the execution variables whose value in the scalability matrix is non-zero;
guides the configuration selection procedure by providing quantitative values for the correlations or couplings between execution time and categories of computing resource from which a type or amount of that category of resource is selectable for the execution.

Representing dependencies not only between execution time and categories of resource, but also between pairs of categories of resource themselves allows for satisfying performance targets of the type "minimize RAM usage" or "minimize disk usage".

For a specific application, a scalability matrix can be created either from benchmarks conducted by the developer or from previous knowledge related to the particular type of algorithm that is being used. Moreover, updated scalability matrices can be provided when the application enters a different execution mode.

Figure 6:
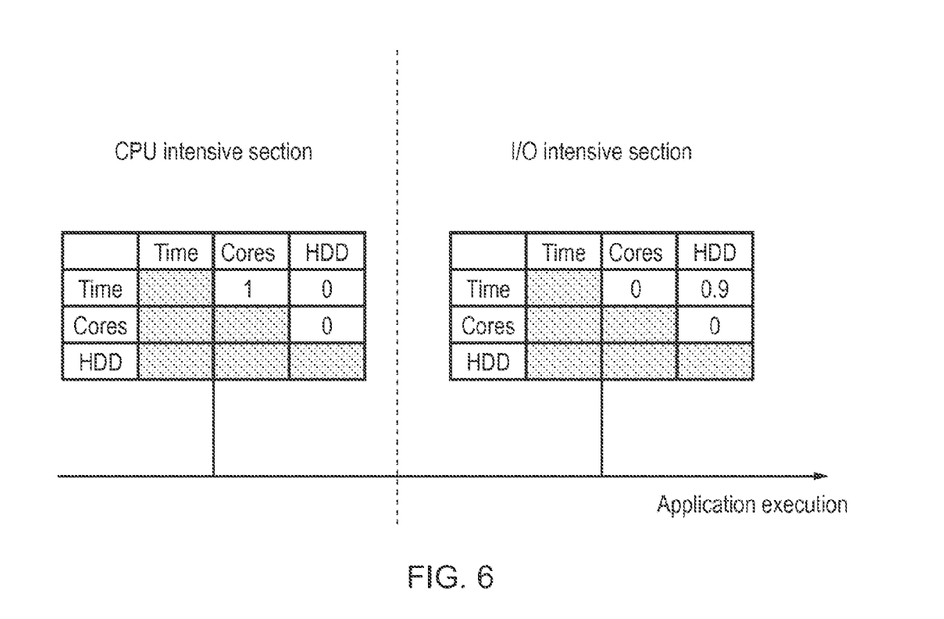
FIG. 6 shows a change in a scalability matrix over time.

FIG. 6 illustrates how a scalability matrix can change during execution of an application. On the left-hand scalability matrix, the number of cores scales perfectly with execution time, because the application being executed is processing-intensive at that stage. On the right-hand scalability matrix, the number of cores does not scale with execution time, but the available hard disk space does (although the scalability is moderated by a factor of 0.9). The changed scalability matrix may lead to selection of changed computing resources.

Figure 7:
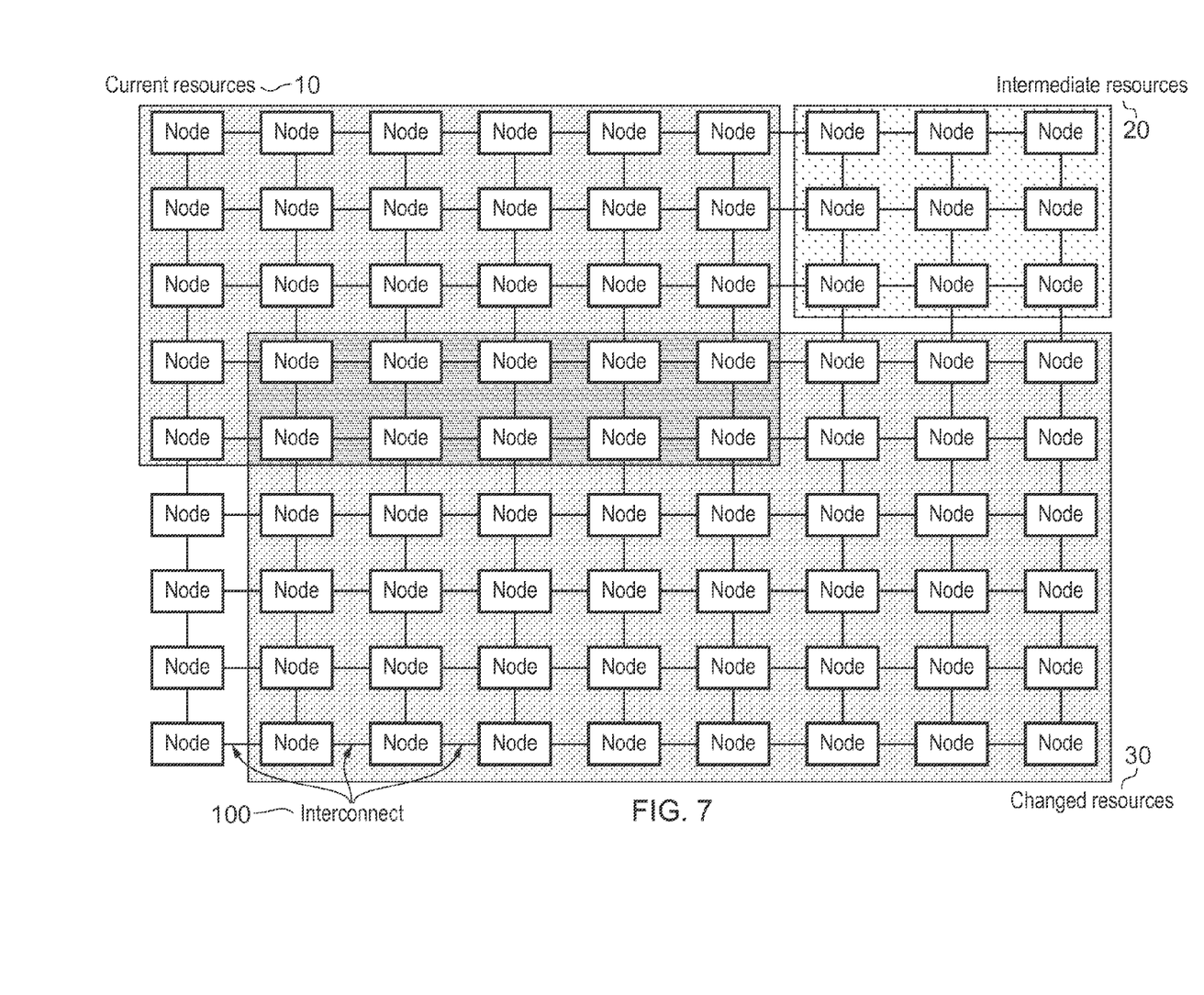
FIG. 7 is a hardware diagram showing nodes of a computer system linked by an interconnect.

FIG. 7 is a hardware diagram showing nodes of a computer system linked by an interconnect 100 and illustrating how current resources, changed resources and intermediate resources can be embodied as different nodes. In the example depicted here, the changed resources are larger (in terms of number of nodes) than the current resources, implying that a decision has been made to increase the resources used. The current and changed resources have overlapping resource (nodes). The intermediate resources are smaller than both the current and the changed resources, and do not overlap with the current or changed computing resources.

Figure 8:
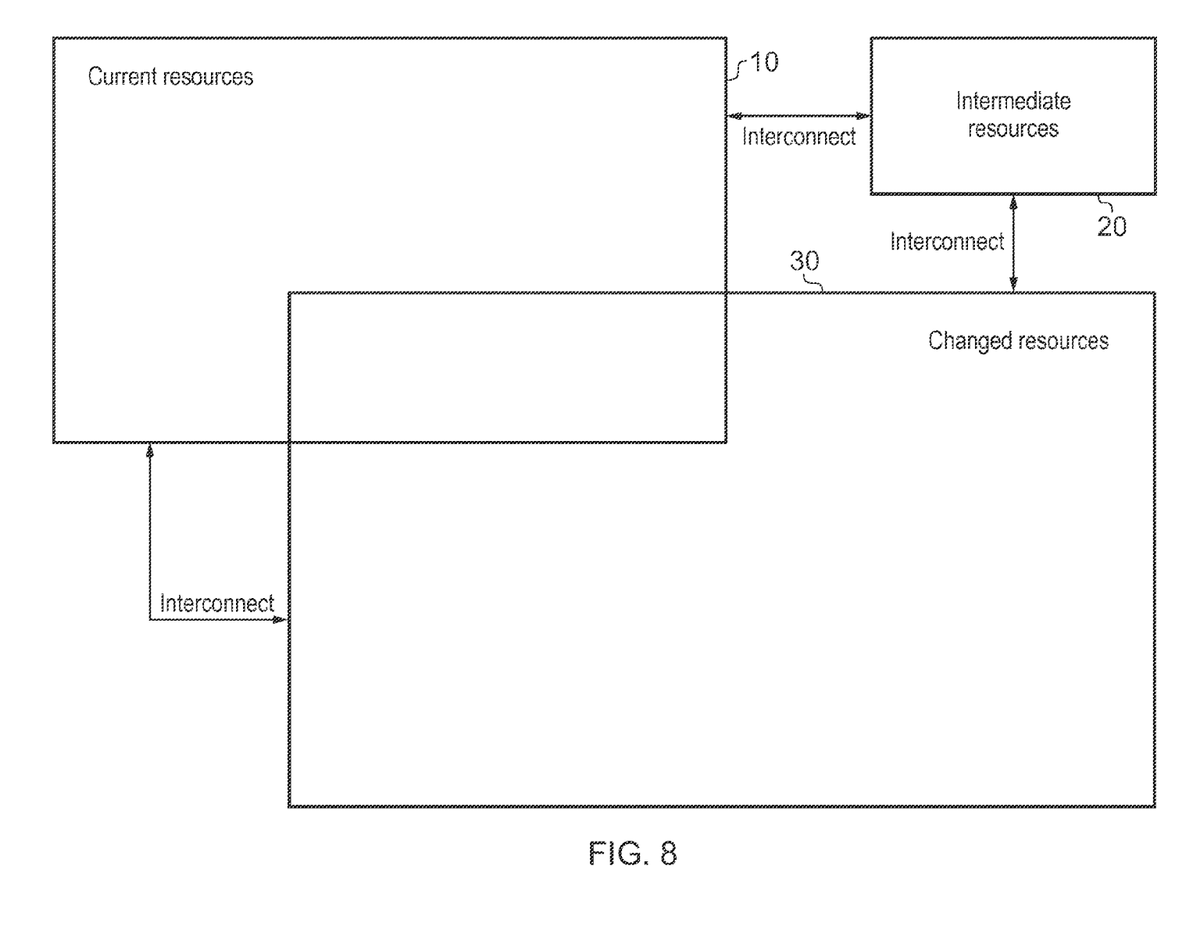
FIG. 8 is an overview of the blocks of resource in FIG. 7.

FIG. 8 is an overview of the blocks of resource in FIG. 7 and the use of the interconnect relationship in migration.

Figure 9:
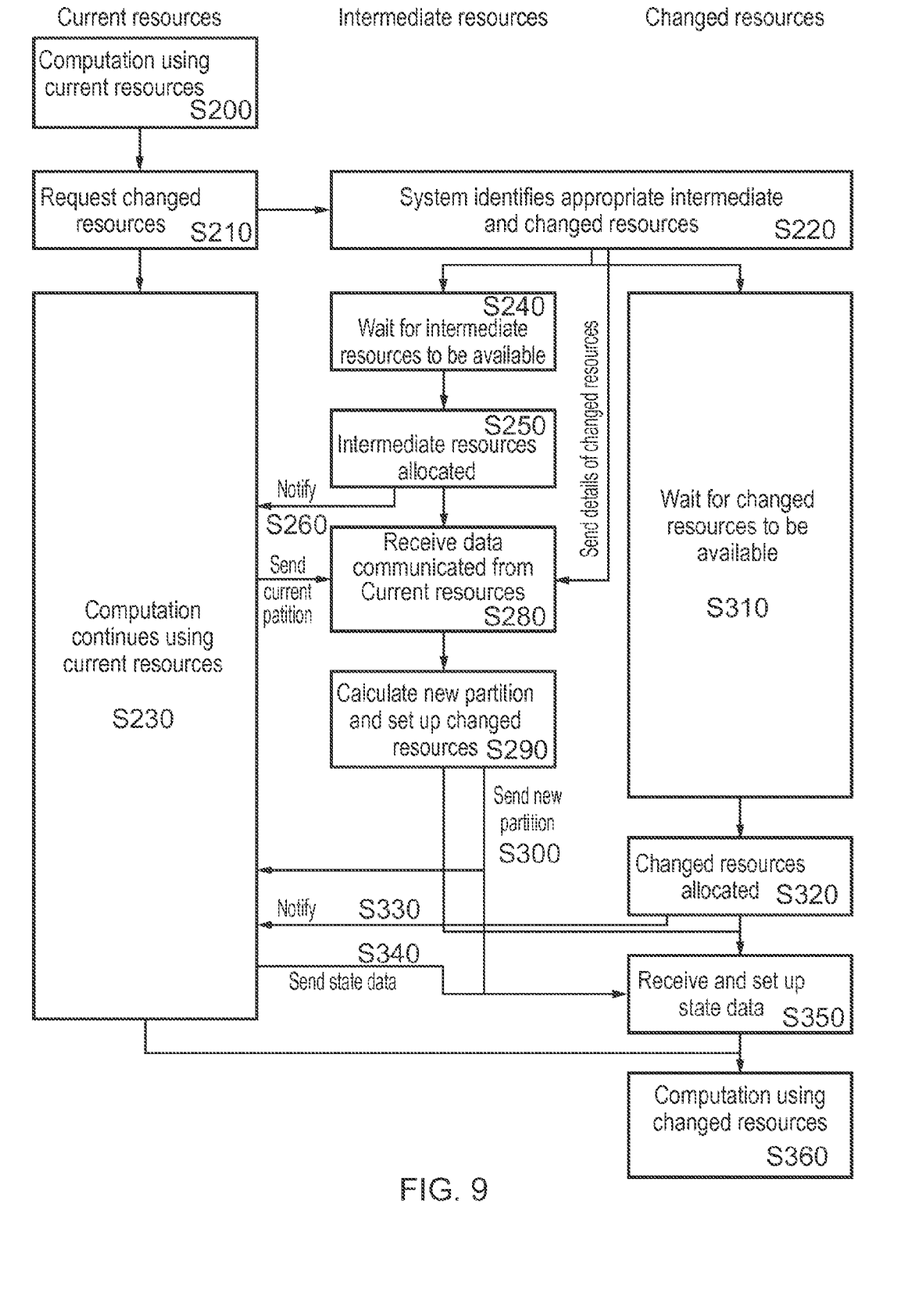
FIG. 9 is a diagram of communication between the current computing resources, intermediate computing resources and changed computing resource.

FIG. 9 is a diagram of communication during the migration process. In step S200 computation uses current resources. In step S210 changed resources are requested (the request is shown in the current resources, but could be external). In step S220, the system identifies appropriate intermediate and changed resources, potentially using a scalability matrix. In step S230 computation continues in the current resources. In step S240 there is a delay waiting for intermediate resources to be available. This delay is in parallel with the longer delay of step S310 waiting for the larger changed resources to be available. In step S250, intermediate resources are allocated and this is notified in step S260 to the current resources, which send the current partition to the intermediate resources in step S270. The intermediate resources receive the data (step S280) along with details of changed resources. Thus the intermediate resources also receive information about what changed resources will be allocated (for example how many nodes, what type of node, etc) from the system so that they know how to re-partition the data that they receive from the current resources. The intermediate resources calculate a new partition and set up the changed resources (S290) as necessary. This set up may include a mapping of processes to individual changed resources, such as individual nodes, (defining what should be sent from where to where). It is also possible that the intermediate resources may be able to do some other initialization (e.g. calculation of some domain-dependent parameter values) and send this direct to the changed resources.

In step S300 the intermediate resources sends the new partition (and mapping) to the changed resources previously allocated in step S320. The allocation is notified to the current resources in step S330, which in return send state data in step S340. The new resources receive and set up the state date in step S350 and computation resumes using the changed resources in step S360. A possible synchronization step of executing one loop of computations simultaneously in the current and changed resources and comparing the results is not shown.

Advantageous features of some invention embodiments are:
  a. The flexibility that embodiments give to move executions to any different system (larger, smaller or the same size). It is highly advantageous that the invention embodiments have the option to implement all three of these cases.
  b. The on-the-fly nature of the migration for a distributed memory system (i.e. the execution does not need to be stopped, moved and then re-started on the new system).
  c. The ability to increase the number of processes (some recent prior art for fault-tolerance consider on-the-fly methods to deal with a reduction in the number of processes, but not an increase).
  d. The controlled nature of the change. In fault-tolerant applications the system copes with an uncontrolled loss of resources. Some of the invention embodiments allow the user to specify exactly how many processes the execution should run on.
  e. The scale of the change in resources—i.e. for fault-tolerance usually only a small number of nodes will fail at any one time, so the idea is to deal with a small reduction in resources. In embodiments of this invention there is capability to make a very large reduction in resources—maybe from thousands of nodes to a single one, due to the migration and synchronisation procedure.

Some invention embodiments also have specific advantages over the related art methodology discussed earlier:
  The changed resources can begin running the application or other program immediately as they become available.
  The set-up phase will be completed faster than it would be if using either the new or old resources.
  The need to pause execution if reducing resources on the same system will be eliminated.

Any of all of these features can lead to the application completing faster than would otherwise be the case (or, in the case of real-time data processing, of clearing a backlog caused by insufficient resources in a more timely fashion).

As set out previously, there are three cases of interest in altering the resources on which a distributed parallel application runs: increasing the current resources (where the current system is a subset of the changed system), decreasing the current resources (where the changed system is a subset of the current) and moving to a new system (which may be of a different size to the current system). In the case of the related art, each of these cases was required to be treated separately (since where the partitioning was to be performed depended on which case was considered). This is not the case if intermediate resources are used: partitioning always takes place on the intermediate system, which may be identified using selection according to execution scalability information. Thus, a further benefit of the invention embodiments can be seen in the increased simplicity of the algorithm: the same steps can be taken in all three cases.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A process migration method, comprising
  executing a computer program on current computing resources, in a current partition of computations of the computer program to parallel processes, each parallel process carrying out at least one computation;
  communicating current partition data including an allocation of computations to process to intermediate computing resources;
  using the intermediate computing resources to calculate new partition data including a new allocation of computations to processes for use on changed computing resources; and
  migrating process execution to the changed computing resources by communicating the new partition data to the changed computing resources.

2. A process migration method according to claim 1, wherein one of calculation of the new partition data overlaps in time with continued execution using the current computing resources and the calculation of the new partition data overlaps in time with allocation of new resources within the changed computing resources.

3. A process migration method according to claim 2, wherein the current and changed computing resources comprise distributed memory computing resources and the intermediate computing resources comprise a shared memory computing resource comprising a symmetric multiprocessor SMP node.

4. A process migration method according to claim 1, wherein the intermediate computing resources are selected by collecting available resource information detailing a plurality of configurations of computing resources available to execute re-partitioning, and selecting a configuration from among the plurality of configurations detailed in the available resource information which, based on execution information, will be suitable for the re-partitioning.

5. A process migration method according to claim 1, wherein the changed computing resources are selected by collecting available resource information detailing a plurality of configurations of computing resources available to execute the processes, and selecting a configuration from among the plurality of configurations detailed in the available resource information which, based on execution information, will be suitable for execution.

6. A process migration method according to claim 4, wherein the configurations each include an indication of one of an amount and type of the computing resource available in each of a plurality of categories of the computing resource; and
  wherein execution information is in a form of application execution scalability information including a scalability matrix encoding, for computing resources in at least one of the plurality of categories, an indication of how different amounts and types of the computing resource in that category correlate with execution rate; and wherein the scalability matrix includes an entry for each pair of factors from among a plurality of factors comprising each of the plurality of categories of the computing resource and the execution rate, an entry representing an effect of a proportional change along a linear scale representing usage of different amounts and types of a first factor from pair of factors on the amount and type required of a second factor from the pair of factors, in terms of the proportional change along a linear scale representing different amounts and types of the second factor.

7. A process migration method according to claim 1, wherein each process uses individual current and changed resources including a single processing unit executing the computation and a single region of memory to store process data for the computation; and wherein the processing unit is one of a node, a processor and a core of a multi-core processor in a distributed memory computing system.

8. A process migration method according to claim 7, wherein the intermediate computing resources are also used to provide a mapping of processes to the individual changed resources before migration of the new partition data and mapping to the changed resources.

9. A process migration method according to claim 1, further including synchronization of the migrated process execution using communication of state data relating to the migrated computations, the communication taking place between the current resources and the changed resources; and
  wherein the synchronization is associated with an equation solver running the computations, and the synchronization is embedded within the equation solver and in a form of a wrapper.

10. A process migration method according to claim 1, wherein the computations are iterations of an equation solver running in a loop, and wherein synchronization is carried out at an end of one loop and includes running the computations for a next loop in both the current computing resources and the changed computing resources, with comparison of results.

11. A process migration method according to claim 1, further including initially deciding to change resources used, and making a choice between increasing the resources used; decreasing the resources used; and moving to different resources, wherein moving to different resources includes one of increase, decrease and maintenance of the resources used.

12. A process migration method according to claim 1, wherein a user specifies a number of processes on which the computer program runs and/or a performance target for the intermediate computing resources and the changed computing resources, the performance target being used in selection of computing resources.

13. A computer system operable to carry out process migration, comprising:
  current computing resources, intermediate computing resources and changed computing resources, all connected via an interconnect;
  the current computing resources being configured to execute a computer program, in a current partition of computations of the computer program to parallel processes, each parallel process carrying out at least one computation;
  the interconnect being configured to communicate current partition data including an allocation of computations to processes to the intermediate computing resources;
  the intermediate computing resources being configured to calculate new partition data including a new allocation of computations to processes for use on the changed computing resources; and
  the interconnect being further configured to communicate the new partition data to the changed computing resources allowing the changed computing resources to take over the execution.

14. Intermediate computing resources within a system comprising the intermediate computing resources, current computing resources executing a computer program, in a current partition of computations of the computer program to parallel processes, each parallel process carrying out at least one computation, and changed computing resources, all connected via an interconnect, the system being operable to carry out process migration;
  the intermediate computing resources comprising memory and a processor, and being configured to receive current partition data including an allocation of computations to processes from the interconnect, to calculate new partition data including a new allocation of computations to processes for use on the changed computing resources; and to communicate the new partition data to the changed computing resources allowing the changed computing resources to take over the execution.

15. A method of selecting re-partitioning computing resources for a process migration method, the method of selecting comprising
  executing a computer program on current computing resources, in a current partition of computations of the computer program to parallel processes, each parallel process carrying out at least one computation;
  selecting re-partitioning computing resources by collecting available resource information detailing a plurality of configurations of computing resources available to execute a process, and selecting a configuration from among the plurality of configurations detailed in available resource information which, based on execution information, will be suitable for re-partitioning;
  communicating current partition data including an allocation of computations to process to the re-partitioning computing resources;
  using the re-partitioning computing resources to calculate new partition data including a new allocation of computations to processes for use on changed computing resources; and
  migrating the process execution to the changed computing resources by communicating the new partition data to the changed computing resources.

* * * * *